Sept. 27, 1960 W. D. McCOURTY 2,954,039
FUEL SUPPLY SYSTEMS FOR GAS TURBINE ENGINES
Filed July 24, 1957 3 Sheets-Sheet 1

Sept. 27, 1960   W. D. McCOURTY   2,954,039
FUEL SUPPLY SYSTEMS FOR GAS TURBINE ENGINES
Filed July 24, 1957   3 Sheets-Sheet 3

INVENTOR
William Donald McCourty
By Moses, Noete & Noete
ATTORNEYS

United States Patent Office 2,954,039
Patented Sept. 27, 1960

2,954,039

FUEL SUPPLY SYSTEMS FOR GAS TURBINE ENGINES

William Donald McCourty, Goldthorn Park, Wolverhampton, England, assignor to H. M. Hobson Limited, London, England, a British company Filed July 24, 1957, Ser. No. 673,938

Claims priority, application Great Britain July 27, 1956

6 Claims. (Cl. 137—34)

This invention relates to apparatus for controlling the rotational speed of an aircraft gas turbine engine of the type comprising an engine-driven centrifugal governor including a servo valve controlling the flow of liquid through an orifice, and subject to a force derived from the bob weights of the governor, a spring exerting an opposing force on the servo valve, a speed-selecting member which is adjustable by the pilot to vary the loading of the spring, and a servo mechanism responsive to movement of the valve and arranged to control the flow of fuel to the engine so as to maintain it running at the speed selected by the pilot.

Investigations into the behaviour of gas turbine engines have shown that there is a period of delay between the moment of changing the rate of flow of fuel into the combustion chamber and the resultant change in engine speed. This delay has a de-stabilizing effect on the control of speed.

It is essential, in order to deal with this instability, to use a governor having a substantial rate, but this introduces a further difficulty, namely off-set or change of the selected speed with changes in fuel demand due for example to changes in temperature and other independent variables. It is the object of this invention to eliminate this off-set.

The problem involved can be best appreciated from Fig. 1 of the accompanying drawings which shows fuel consumption/r.p.m. plotted against engine speed for various changes in engine demand. The curve A represents the variations in fuel demand under one set of conditions and the curve B is the corresponding curve for another set of conditions. The dotted curves represent the corresponding variations in fuel demand at intermediate conditions.

If the governor is isochronous, e.g. if the governor has no rate, its characteristic would be represented by the vertical line CD, there would be no off-set and the selected speed would be the same for all conditions. As indicated above, however, such a governor cannot be used because of its instability. When the governor has a substantial rate, the governor characteristic is represented by CE and it will be seen that as the fuel demand decreases the speed off-sets progressively from the selected value of S to speeds represented by $S_1$, $S_2$, $S_3$ and $S_4$.

According to the invention, for the purpose of counteracting the effects of off-set in apparatus of the above type having a governor of substantial rate, I provide an auxiliary governor which is operative on the main governor to alter the setting thereof at a rate proportional to the error therein resulting from the said off-set.

Preferably the flow of fuel to the engine is controlled by a flow control unit comprising a metering valve operable by the speed-selecting member and a pressure regulating valve for determining the metering pressure across a metering orifice controlled by the metering valve, the pressure regulating valve moving to vary the metering pressure in response to variations in flow through the orifice controlled by the servo valve of the governor. In the preferred form of the invention the pressure regulating valve is actuated by a pressure sensitive device subject to the fluid pressure upstream of the orifice controlled by the servo valve and the auxiliary governor is effective to modify this fluid pressure to compensate for departure of the servo valve from its correct controlling position.

One specific embodiment of the invention will now be described in detail, by way of example, with reference to the accompanying drawings, in which:

Fig. 1 shows the fuel curves already referred to,

Figure 1:
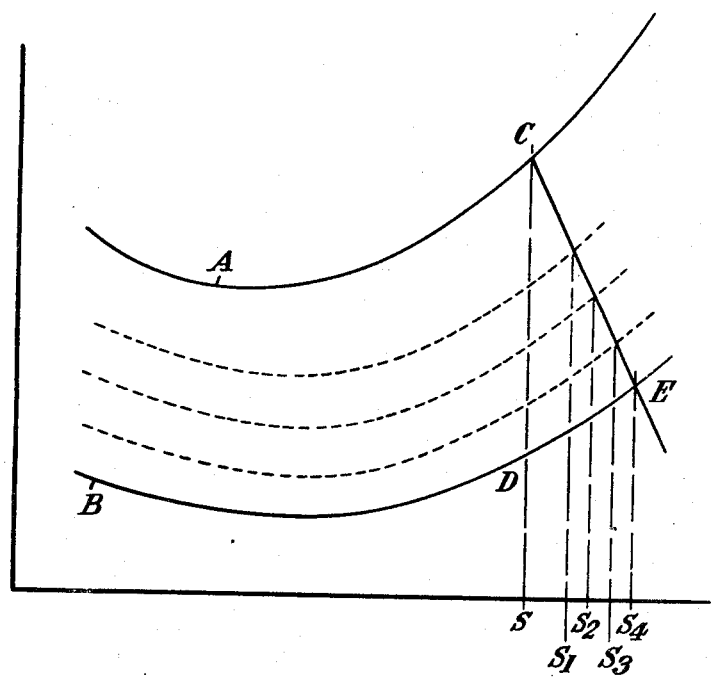

The fuel supply system is of the kind described in U.S. application Serial No. 611,245 and comprises an engine-driven centrifugal pump 40, constituting the main fuel pump, which supplies fuel through a pipe 10 to a flow control unit 9 and then through a pipe 13 to an acceleration control unit 41 from which the fuel passes to the inlet of a circulating pump 42. This is an engine-driven centrifugal pump which supplies fuel in a closed circuit to a distributor 43. The distributor has a number of swirl chambers 44, each communicating by an outlet 45 with one of the jet burners 46 in the engine. A pressure-operated valve 47 is interposed between the distributor 43 and each burner 46. Fuel from the pump 42 is supplied to all the swirl chambers 44 from a common delivery gallery 48 and excess fuel is returned from the swirl chambers to the inlet of the pump 42 via a spill gallery 49 and a spill line 50 containing a flap valve 51 which prevents reverse flow in the closed loop. The pump 42 has a by-pass line containing a labyrinth and an oil cooler 52 in heat exchange relationship with the labyrinth provides cooling for the engine oil.

The flow control unit 9 contains a metering orifice 11, controlled by a metering valve 12, through which fuel passes through the pipe 13 to the acceleration control unit 41. The pressure drop across the metering orifice 11 is controlled by a pressure regulating valve 14 connected to a diaphragm 15 loaded by a spring 16 of substantial rate. The position of the metering valve 12 is controlled by a cam 17, which is rotatable by a lever 18 coupled to the pilot's speed selecting lever 19 and is movable axially by a servo piston 20 controlled by a bellows 53 mounted in a housing 54 to which air at ram pressure is admitted through an inlet 55. The bellows exerts on the right-hand end of a centrally pivoted beam 56 a force opposed by a spring 57. The other end of the beam 56 constitutes a valve 58 controlling the effective area of an orifice 59 through which fuel may flow to the suction side of the pump 40 from the underside of the servo piston 20. The fuel obtains access to the underside of the servo piston through a restrictor 60 and the servo piston 20 is urged upwardly by a spring 61.

As will be apparent, increase in ram pressure will cause the valve 58 to move towards a more open position, whereupon the servo piston 20 and cam 17 descend to cause the metering valve 12 to open to supply more fuel to the engine. The metering valve 12 is moved towards the closed position on decrease in the ram pressure. Movement of the pilot's speed selecting lever 19 anticlockwise from the stop position shown towards the full power position F.P. will cause the lever 18 to rotate the cam 17 and thereby move the metering valve 12 to a more open position.

The governor comprises a speed-responsive element 21 and an acceleration-responsive element 22. The element 21 comprises bob weights 23 driven by the engine through a shaft 123 and exerting pressure on a rod 24 in opposition to the pressure of a spring 25. The speed-selecting lever 19 carries a cam 26 which bears against an abutment 27 for the spring 25 and serves to increase the compression of the spring 25 as the lever 19 is moved anti-clockwise to select a higher speed. The acceleration-responsive element 22, which is not essential, applies, through the agency of a pivoted mass 62 and an associated calibrated orifice 63, a hydraulic force to the rod 24 in opposition to the spring 25 as described in U.S. application Serial No. 492,956.

Fuel from the upstream side of the metering orifice 11 flows through a restriction 28 and a pipe 29 to an orifice 30 controlled by a pivoted lever 31 coupled to the end of the rod 24 and thence, through a valve 32, which maintains a constant pressure drop across the orifice 30, to a pipe 33 leading to the suction side of the pump 40.

When the engine is running at a speed within the band in which the governor is operative, decrease in the engine speed from the selected value causes the lever 31 to be rocked clockwise to increase the area of the orifice 30, thereby reducing the pressure acting on the left-hand side of the diaphragm 15 and causing the pressure regulating valve 14 to move to the left to provide a temporary increase in the fuel flow to the engine. The reverse action takes place on increase in the engine speed from the selected value.

Figure 2:
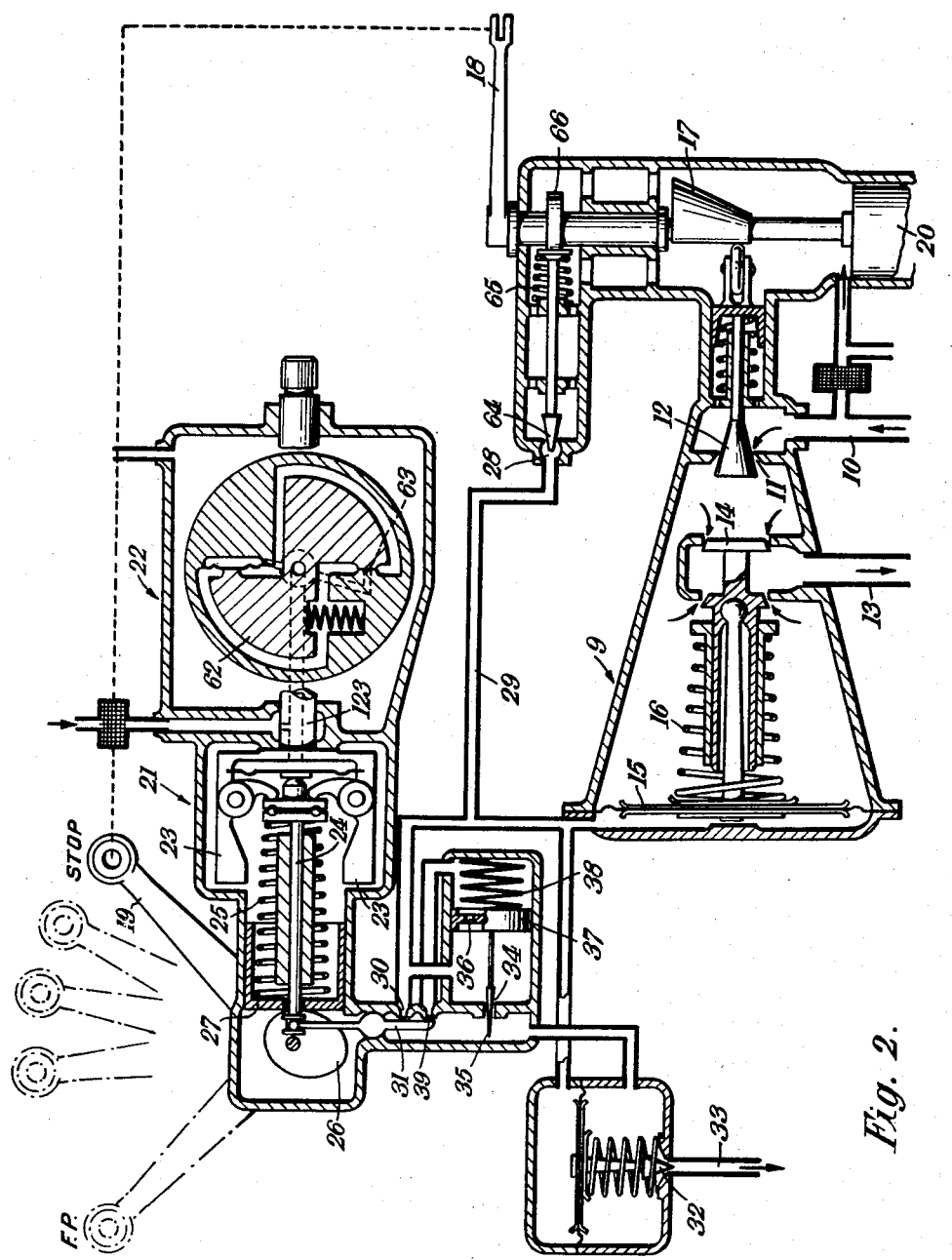
Fig. 2 shows diagrammatically the governor of the fuel supply system, the associated anti-off-set device and the flow control unit.
Figure 3:
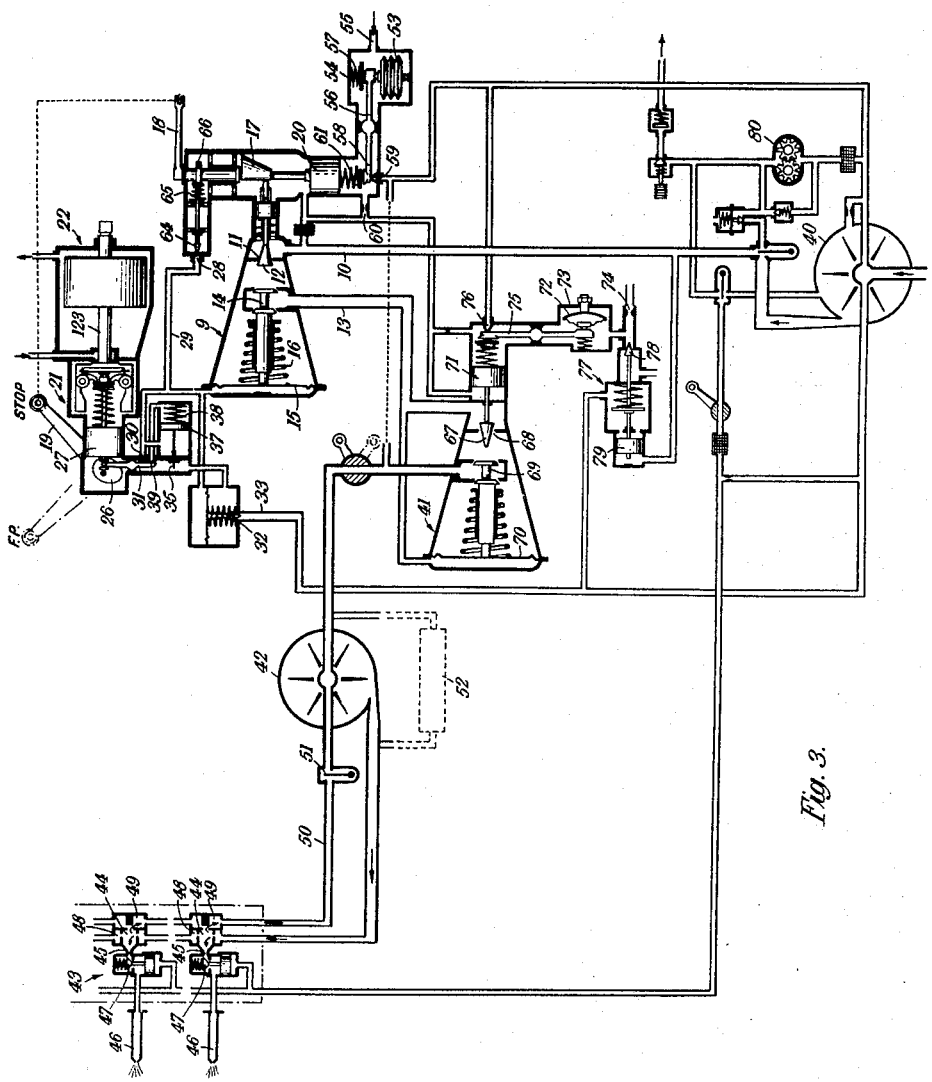
Fig. 3 is a diagram on a smaller scale showing the complete fuel supply system.

The lever 31 should occupy an identical position for all fuel demands when the engine is running at the selected speed. However, the bob weights 23 will have to move to different positions under different conditions to effect the required changes in flow of fuel in the system and the loading of the spring 25 will be different in these different positions of the bob weights. Consequently, with the system as so far described, the lever 31 will vary slightly in position as the fuel demand varies with the speed-selecting lever 19 remaining in the same position. As the fuel demand decreases, the governor is unable to do more than maintain a speed slightly higher than the selected speed, as indicated by the line CE in Fig. 1, and is therefore unable to return the lever 31 clockwise to the position shown in Fig. 2. The lever 31 therefore assumes a position displaced slightly anti-clockwise from that shown and to an extent increasing progressively with decrease in fuel demand. Correction of the position of the lever 31 is achieved by the anti-off-set device which will now be described. This device does not respond to the transient changes in position of the lever 31 which occur during normal governing at constant fuel demand but only to the above-mentioned slow changes in position of the lever 31 which occur during changes in fuel demand.

Fuel can flow from the line 29 to the valve 32 through two other paths besides that afforded by the orifice 30. The first alternative path is through an orifice 34 controlled by a needle 35. The second alternative path is through an orifice 36, in a servo piston 37 attached to the needle 35 and loaded by a low rate spring 38, and thence through a second orifice 39 controlled by the lever 31. This low rate spring 38 ensures that since the flow of liquid through the orifice 36 is constant the rate of displacement of the piston is proportional to the positive error in the lever 31. There are, of course, other ways of producing a displacement of this type, but most of them entail the use of precision parts with the consequent disadvantages of foreign particles in the fuel affecting those parts, whereas in the present construction there are no precision parts, the piston being only of a fit such that leakage of fuel around its periphery is of a small order relative to the fuel passing through the orifice.

The orifice 30 has the major control over the response of the flow control unit 9 to the action of the governor as already described. The orifice 39 senses changes in position of the lever 31 and produces a small change in the position of the needle 35 to vary the effective area of the orifice 34.

When the fuel demand decreases, the lever 31 is displaced anti-clockwise from the position shown as already explained and the resulting reduction in flow of liquid through the orifice 39 results in a decreased pressure drop across the piston 37 which accordingly moves the needle 35 to the left to decrease the flow through the orifice 34. This produces a decrease in pressure drop across the orifice 28 and therefore a movement of the diaphragm 15 and pressure regulating valve 14 to the right to provide a momentary decrease in flow of fuel to the engine. The engine speed accordingly decreases and enables the governor to return the lever 31 clockwise to the position shown. Thus, as the fuel demand decreases, the needle 35 moves progressively to the left to permit the governor to maintain the selected speed.

As will be appreciated the reverse action takes place on increase in fuel demand. The governor then, if unassisted by the anti-off-set device, would maintain a speed less than the selected value and the lever 31 would remain in a position displaced clockwise from that shown. The resulting increased flow through the orifice 39 then causes the piston 37 to move the needle 35 to the right to increase the flow through the orifice 34. The resulting momentary increase in fuel flow causes the engine to speed up and permits the lever 31 to move back to its correct position.

The orifice 28 is controlled by a needle 64 loaded by a spring 65. As explained more fully in U.S. application Serial No. 611,245, the needle 64 is retracted by the spring 65 at speeds at which the governor is inoperative. When, however, the pilot moves his lever 19 into a position corresponding to an engine speed in the top band in which the governor is operative, a cam 66 attached to the lever 18 moves the needle 64 to the left into position to control the orifice 28.

The acceleration control unit 41 need only be briefly described as its operation is fully explained in U.S. application Serial No. 611,245. It comprises a needle 67 controlling a metering orifice 68, the metering pressure across which is controlled by a pressure regulating valve 69 attached to a diaphragm 70. The position of the needle 67 is controlled by a servo piston 71 the position of which is in turn controlled, as explained in the aforesaid U.S. application, by a capsule 72 in a housing 73 to which air at compressor delivery pressure is admitted through an inlet 74. Increase in compressor delivery pressure causes a beam 75 to rock anti-clockwise to increase the flow through an orifice 76, so causing the servo piston 71 to move to the right to increase the flow through the orifice 68. The reverse action takes place on reduction in compressor delivery pressure. An air potentiometer 77, comprising a needle 78 and associated piston 79 subject to the delivery pressure of the pump 40, serves, as fully explained in U.S. application No. 611,245, to restrict the flow of fuel to the engine during periods of acceleration.

The system includes an engine-driven gear pump 80 which supplies fuel to the engine during starting and is automatically rendered inoperative, also as fully described in U.S. application No. 611,245, when the main pump 40 has developed sufficient pressure to take over.

What I claim as my invention and desire to secure by Letters Patent is:

1. Apparatus for controlling the rotational speed of an aircraft gas turbine engine comprising, in combination with said engine, means for discharging liquid through an orifice, an engine driven centrifugal governor of substantial rate, said governor including bob weights, a servo valve controlling the effective area of said orifice and subject in one direction to a force derived from said bob weights and a spring exerting an opposing force on said servo valve, a manually operable speed selecting member for adjusting the loading of said spring, said bob weights and spring jointly controlling the position of said servo valve and being operative to maintain it, so long as the engine speed remains at the value selected by said speed selecting member, in a predetermined controlling position in relation to said orifice permitting of a predetermined flow of liquid through the orifice, a flow control mechanism for controlling the flow of fuel to the engine, means responsive to changes in the effective area of said orifice, arising from transient departures of the servo valve from its controlling position, for adjusting said flow control mechanism to maintain the engine running at the speed selected by the speed selecting member and further normally inoperable means, operative when the servo valve dwells in a position away from its controlling position, to adjust said flow control mechanism to provide the fuel flow requisite to return the servo valve to its controlling position.

2. Apparatus for controlling the rotational speed of a gas turbine engine comprising, in combination with said engine, means for discharging liquid through a main orifice and also through a subsidiary orifice in parallel with the main orifice, an engine driven centrifugal governor of substantial rate, said governor including bob weights, a servo valve controlling the effective areas of both of said orifices and subject in one direction to a force derived from said bob weights and a spring exerting an opposing force on said servo valve, a manually operable speed selecting member for adjusting the loading of the spring, said bob weights and spring jointly controlling the position of the servo valve in relation to the orifices and maintaining it in a datum position when the engine is running at the speed selected by said member, a servo mechanism responsive both to changes in effective area of the main orifice arising from transient departure of the servo valve from its datum position and to changes in effective area of the subsidiary orifice occurring when said servo valve dwells in a position away from its datum position, and means operable by said servo mechanism, on response thereof to change in the flow of liquid through either orifice, to control the flow of fuel to the engine to maintain it running at the speed selected by said speed selecting member.

3. A fuel supply system for an aircraft gas turbine engine comprising, in combination with said engine, a flow control unit for controlling the flow of fuel to said engine, said unit including a metering orifice for the fuel, a metering valve controlling said metering orifice and a pressure regulating valve determining the metering pressure across said metering orifice, means for discharging liquid through a control orifice, and also through a subsidiary orifice in parallel with the control orifice, an engine driven centrifugal governor of substantial rate, said governor including bob weights, a servo valve controlling the effective area of both of said orifices and subject in one direction to a force derived from said bob weights and a spring exerting an opposing force on said servo valve, said bob weights and spring jointly controlling the position of said servo valve in relation to said control orifice and subsidiary orifice, a manually operable speed selecting member for adjusting the loading of said spring, means actuable by said speed selecting member for varying the position of said metering valve, a pressure sensitive device subject to the hydraulic pressure upstream of said control orifice for adjusting said pressure regulating valve and thereby controlling the flow of fuel to the engine to maintain it running at the speed selected by the speed selecting member and correcting means responsive to changes in the flow of liquid through said subsidiary orifice for modifying the hydraulic pressure on said pressure sensitive device and thereby adjusting said device to compensate for errors in the position of said servo valve.

4. Apparatus as claimed in claim 3, wherein said correcting means comprises a needle controlling a further orifice permitting liquid to flow from the upstream side of said control orifice and a servo member connected to said needle and operative to adjust its position in response to changes in the flow of liquid through said subsidiary orifice.

5. Apparatus as claimed in claim 3, wherein said correcting means comprises a needle controlling a further orifice in parallel with said control orifice, a servo piston connected to said needle and movable to adjust its position and conduit means permitting of flow of liquid from the upstream side of said control orifice to one side of said servo piston, thence permitting restricted flow to the other side of said servo piston and thence to said subsidiary orifice, said servo piston moving to adjust said needle in response to variation in the flow of liquid through said subsidiary orifice.

6. Apparatus as claimed in claim 3, comprising conduit means for the passage of fuel from the upstream side of the metering orifice to said control orifice and to said subsidiary orifice, said conduit means including a restriction, a needle movable in relation to said restriction to vary the flow of fuel therethrough, and an operative connection between said speed-selecting member and said needle for moving said needle into the restriction when a high engine speed is selected and for withdrawing the needle from the restriction when a lower engine speed is selected.

References Cited in the file of this patent

UNITED STATES PATENTS

| | | |
|---|---|---|
| 1,509,695 | Volet | Sept. 23, 1924 |
| 2,669,973 | Parker | Feb. 23, 1954 |
| 2,702,560 | Bobier | Feb. 22, 1955 |
| 2,727,523 | Brown | Dec. 20, 1955 |
| 2,824,549 | Whitehead | Feb. 25, 1958 |